(12) United States Patent
Wang et al.

(10) Patent No.: US 7,774,279 B2
(45) Date of Patent: Aug. 10, 2010

(54) RIGHTS OFFERING AND GRANTING

(75) Inventors: Xin Wang, Torrance, CA (US); Bijan Tadayon, Germantown, MD (US)

(73) Assignee: Contentguard Holdings, Inc., Wilmington, DE (US)

( * ) Notice: Subject to any disclaimer, the term of this patent is extended or adjusted under 35 U.S.C. 154(b) by 1954 days.

(21) Appl. No.: 10/162,212

(22) Filed: Jun. 5, 2002

(65) Prior Publication Data
US 2003/0009423 A1    Jan. 9, 2003

Related U.S. Application Data

(63) Continuation-in-part of application No. 09/867,745, filed on May 31, 2001, now Pat. No. 6,754,642.

(60) Provisional application No. 60/296,113, filed on Jun. 7, 2001, provisional application No. 60/331,625, filed on Nov. 20, 2001, provisional application No. 60/331,624, filed on Nov. 20, 2001.

(51) Int. Cl.
   *H04L 9/00* (2006.01)
(52) U.S. Cl. .............................. 705/51; 705/54; 705/75; 380/279
(58) Field of Classification Search .................... 705/1, 705/51, 54, 75
   See application file for complete search history.

(56) References Cited

U.S. PATENT DOCUMENTS

| | | | |
|---|---|---|---|
| 3,263,158 A | 7/1966 | Janis | |
| 3,609,697 A | 9/1971 | Blevins et al. | |
| 3,790,700 A | 2/1974 | Callais et al. | |
| 3,798,605 A | 3/1974 | Feistel | |
| 4,159,468 A | 6/1979 | Barnes et al. | |
| 4,200,700 A | 4/1980 | Mäder | |
| 4,220,991 A | 9/1980 | Hamano et al. | |
| 4,278,837 A | 7/1981 | Best | |
| 4,323,921 A | 4/1982 | Guillou | |
| 4,361,851 A | 11/1982 | Asip et al. | |
| 4,423,287 A | 12/1983 | Zeidler | |

(Continued)

FOREIGN PATENT DOCUMENTS

BR    9810967 A    10/2001

(Continued)

OTHER PUBLICATIONS

"National Semiconductor and EPR Partner for Information Metering/Data Security Cards" Mar. 4, 1994, Press Release from Electronic Publishing Resources, Inc.

(Continued)

*Primary Examiner*—Evens J Augustin
(74) *Attorney, Agent, or Firm*—Marc S. Kaufman; Stephen M. Hertzler; Nixon Peabody, LLP

(57) ABSTRACT

Processes and systems for offering and granting digital rights that govern distribution and usage of content, services and resources. The processes and systems provide a basis for flexible business models and negotiation transactions between content providers and users. The concept of meta-rights, which permit digital rights to be derived, permits upstream parties in a content distribution chain to dictate rights granted and received by downstream parties. Therefore, each transaction can be considered as a two party transaction between a rights supplier and a rights consumer.

31 Claims, 11 Drawing Sheets

U.S. PATENT DOCUMENTS

| | | |
|---|---|---|
| 4,429,385 A | 1/1984 | Cichelli et al. |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,621,321 A | 11/1986 | Boebert et al. |
| 4,644,493 A | 2/1987 | Chandra et al. |
| 4,658,093 A | 4/1987 | Hellman |
| 4,713,753 A | 12/1987 | Boebert et al. |
| 4,736,422 A | 4/1988 | Mason |
| 4,740,890 A | 4/1988 | William |
| 4,796,220 A | 1/1989 | Wolfe |
| 4,816,655 A | 3/1989 | Musyck et al. |
| 4,817,140 A | 3/1989 | Chandra et al. |
| 4,827,508 A | 5/1989 | Shear |
| 4,868,376 A | 9/1989 | Lessin et al. |
| 4,888,638 A | 12/1989 | Bohn |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,129,083 A | 7/1992 | Cutler et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,174,641 A | 12/1992 | Lim |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,287,408 A | 2/1994 | Samson |
| 5,291,596 A | 3/1994 | Mita |
| 5,293,422 A | 3/1994 | Loiacono |
| 5,301,231 A | 4/1994 | Abraham et al. |
| 5,311,591 A | 5/1994 | Fischer |
| 5,319,705 A | 6/1994 | Halter et al. |
| 5,335,275 A | 8/1994 | Millar et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,386,369 A | 1/1995 | Christiano |
| 5,390,297 A | 2/1995 | Barber et al. |
| 5,394,469 A | 2/1995 | Nagel et al. |
| 5,410,598 A | 4/1995 | Shear |
| 5,412,717 A | 5/1995 | Fischer |
| 5,414,852 A | 5/1995 | Kramer et al. |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,485,577 A | 1/1996 | Eyer et al. |
| 5,499,298 A | 3/1996 | Narasimhalu et al. |
| 5,502,766 A | 3/1996 | Boebert et al. |
| 5,504,814 A | 4/1996 | Miyahara |
| 5,504,816 A | 4/1996 | Hamilton et al. |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,535,276 A | 7/1996 | Ganesan |
| 5,539,735 A | 7/1996 | Moskowitz |
| 5,553,143 A | 9/1996 | Ross et al. |
| 5,557,678 A | 9/1996 | Ganesan |
| 5,563,946 A | 10/1996 | Cooper et al. |
| 5,564,038 A | 10/1996 | Grantz et al. |
| 5,568,552 A | 10/1996 | Davis |
| 5,619,570 A | 4/1997 | Tsutsui |
| 5,621,797 A | 4/1997 | Rosen |
| 5,625,690 A | 4/1997 | Michel et al. |
| 5,629,980 A | 5/1997 | Stefik et al. |
| 5,633,932 A | 5/1997 | Davis et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,649,013 A | 7/1997 | Stuckey et al. |
| 5,655,077 A | 8/1997 | Jones et al. |
| 5,671,412 A * | 9/1997 | Christiano ............... 707/104.1 |
| 5,708,709 A | 1/1998 | Rose |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,745,879 A | 4/1998 | Wyman |
| 5,748,783 A | 5/1998 | Rhoads |
| 5,757,907 A | 5/1998 | Cooper et al. |
| 5,758,069 A | 5/1998 | Olsen |
| 5,761,686 A | 6/1998 | Bloomberg |
| 5,764,807 A | 6/1998 | Pearlman et al. |
| 5,765,152 A | 6/1998 | Erickson |
| 5,768,426 A | 6/1998 | Rhoads |
| 5,787,172 A | 7/1998 | Arnold |
| 5,790,664 A * | 8/1998 | Coley et al. ................. 709/203 |
| 5,790,677 A | 8/1998 | Fox et al. |
| 5,794,207 A | 8/1998 | Walker et al. |
| 5,812,664 A | 9/1998 | Bernobich et al. |
| 5,825,876 A | 10/1998 | Peterson |
| 5,825,879 A | 10/1998 | Davis |
| 5,825,892 A | 10/1998 | Braudaway et al. |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |
| 5,892,900 A | 4/1999 | Ginter et al. |
| 5,910,987 A | 6/1999 | Ginter et al. |
| 5,915,019 A | 6/1999 | Ginter et al. |

| | | |
|---|---|---|
| 5,917,912 A | 6/1999 | Ginter et al. |
| 5,920,861 A | 7/1999 | Hall et al. |
| 5,925,127 A * | 7/1999 | Ahmad ............... 726/31 |
| 5,933,498 A | 8/1999 | Schneck et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,987,134 A | 11/1999 | Shin et al. |
| 5,991,306 A | 11/1999 | Burns et al. |
| 5,999,624 A | 12/1999 | Hopkins |
| 5,999,949 A | 12/1999 | Crandall |
| 6,006,332 A | 12/1999 | Rabne et al. |
| 6,009,401 A * | 12/1999 | Horstmann ............... 705/1.1 |
| 6,020,882 A | 2/2000 | Kinghorn et al. |
| 6,047,067 A | 4/2000 | Rosen |
| 6,056,786 A * | 5/2000 | Rivera et al. ............... 717/168 |
| 6,073,234 A | 6/2000 | Kigo et al. |
| 6,091,777 A | 7/2000 | Guetz et al. |
| 6,112,181 A | 8/2000 | Shear et al. |
| 6,112,239 A | 8/2000 | Kenner et al. |
| 6,115,471 A | 9/2000 | Oki et al. |
| 6,135,646 A | 10/2000 | Kahn et al. |
| 6,138,119 A | 10/2000 | Hall et al. |
| 6,141,754 A | 10/2000 | Choy |
| 6,157,719 A | 12/2000 | Wasilewski et al. |
| 6,157,721 A | 12/2000 | Shear et al. |
| 6,169,976 B1 | 1/2001 | Colosso |
| 6,185,683 B1 | 2/2001 | Ginter et al. |
| 6,189,037 B1 | 2/2001 | Adams et al. |
| 6,189,146 B1 | 2/2001 | Misra et al. |
| 6,209,092 B1 | 3/2001 | Linnartz |
| 6,216,112 B1 | 4/2001 | Fuller et al. |
| 6,219,652 B1 | 4/2001 | Carter et al. |
| 6,226,618 B1 * | 5/2001 | Downs et al. ............... 705/1.1 |
| 6,233,684 B1 | 5/2001 | Stefik et al. |
| 6,236,971 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,292,569 B1 | 9/2001 | Shear et al. |
| 6,301,660 B1 | 10/2001 | Benson |
| 6,307,939 B1 | 10/2001 | Vigarie |
| 6,327,652 B1 | 12/2001 | England et al. |
| 6,330,670 B1 | 12/2001 | England et al. |
| 6,345,256 B1 | 2/2002 | Milsted et al. |
| 6,353,888 B1 | 3/2002 | Kakehi et al. |
| 6,363,488 B1 | 3/2002 | Ginter et al. |
| 6,389,402 B1 | 5/2002 | Ginter et al. |
| 6,397,333 B1 | 5/2002 | Söhne et al. |
| 6,401,211 B1 | 6/2002 | Brezak, Jr. et al. |
| 6,405,369 B1 | 6/2002 | Tsuria |
| 6,424,717 B1 | 7/2002 | Pinder et al. |
| 6,424,947 B1 | 7/2002 | Tsuria et al. |
| 6,487,659 B1 | 11/2002 | Kigo et al. |
| 6,516,052 B2 | 2/2003 | Voudouris |
| 6,516,413 B1 | 2/2003 | Aratani et al. |
| 6,523,745 B1 | 2/2003 | Tamori |
| 6,796,555 B1 | 9/2004 | Blahut |
| 2001/0009026 A1 | 7/2001 | Terao et al. |
| 2001/0011276 A1 | 8/2001 | Durst, Jr. et al. |
| 2001/0014206 A1 | 8/2001 | Artigalas et al. |
| 2001/0037467 A1 | 11/2001 | O'Toole, Jr. et al. |
| 2001/0039659 A1 | 11/2001 | Simmons et al. |
| 2002/0001387 A1 | 1/2002 | Dillon |
| 2002/0010759 A1 * | 1/2002 | Hitson et al. ............... 709/219 |
| 2002/0035618 A1 | 3/2002 | Mendez et al. |
| 2002/0044658 A1 | 4/2002 | Wasilewski et al. |
| 2002/0056118 A1 | 5/2002 | Hunter et al. |
| 2002/0069282 A1 | 6/2002 | Reisman |
| 2002/0099948 A1 | 7/2002 | Kocher et al. |
| 2002/0127423 A1 | 9/2002 | Kayanakis |
| 2003/0097567 A1 | 5/2003 | Terao et al. |
| 2004/0052370 A1 | 3/2004 | Katznelson |
| 2004/0172552 A1 | 9/2004 | Boyles et al. |

FOREIGN PATENT DOCUMENTS

| | | |
|---|---|---|
| EP | 0 067 556 B1 | 12/1982 |
| EP | 0 084 441 | 7/1983 |
| EP | 0 180 460 | 5/1986 |
| EP | 0 257 585 A2 | 3/1988 |
| EP | 0 262 025 A2 | 3/1988 |
| EP | 0 332 304 A2 | 9/1989 |
| EP | 0 332 304 A3 | 9/1989 |
| EP | 0 332 707 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 651 554 | 5/1995 |
| EP | 0 668 695 | 8/1995 |
| EP | 0 678 836 A1 | 10/1995 |
| EP | 0 679 977 A1 | 11/1995 |
| EP | 0 715 243 A | 6/1996 |
| EP | 0 715 243 A1 | 6/1996 |
| EP | 0 715 244 A | 6/1996 |
| EP | 0 715 244 A1 | 6/1996 |
| EP | 0 715 245 A1 | 6/1996 |
| EP | 0 715 246 A | 6/1996 |
| EP | 0 725 376 | 8/1996 |
| EP | 0 731 404 A1 | 9/1996 |
| EP | 0 763 936 A2 | 3/1997 |
| EP | 0 818 748 A | 1/1998 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 041 823 A2 | 10/2000 |
| EP | 1 103 922 A2 | 5/2001 |
| GB | 1483282 | 8/1977 |
| GB | 2022969 A | 12/1979 |
| GB | 2 136 175 | 9/1984 |
| GB | 2 236 604 | 4/1991 |
| GB | 2236604 A | 4/1991 |
| GB | 2309364 A | 7/1997 |
| GB | 2316503 A | 2/1998 |
| GB | 2354102 A | 3/2001 |
| JP | 62-241061 | 10/1987 |
| JP | 64-068835 | 3/1989 |
| JP | 3-063717 A | 3/1991 |
| JP | 04-369068 | 12/1992 |
| JP | 5-100939 | 4/1993 |
| JP | 5168039 A2 | 7/1993 |
| JP | 05-268415 | 10/1993 |
| JP | 6-131371 A | 5/1994 |
| JP | 06-175794 | 6/1994 |
| JP | 06-215010 | 8/1994 |
| JP | 7-36768 | 2/1995 |
| JP | 07-084852 | 3/1995 |
| JP | 07-200317 | 8/1995 |
| JP | 07-244639 | 9/1995 |
| JP | 0 715 241 | 6/1996 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 | 11/1992 |
| WO | WO 92/20022 A1 | 11/1992 |

| | | |
|---|---|---|
| WO | WO 93/01550 | 1/1993 |
| WO | WO 93/01550 A1 | 1/1993 |
| WO | WO 93/11480 A1 | 6/1993 |
| WO | WO 94/01821 | 1/1994 |
| WO | WO 94/03003 A1 | 2/1994 |
| WO | WO 96/13814 A1 | 5/1996 |
| WO | WO 96/24092 | 8/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 97/48203 | 12/1997 |
| WO | WO 98/09209 A1 | 3/1998 |
| WO | WO 98/10561 A1 | 3/1998 |
| WO | WO 98/11690 | 3/1998 |
| WO | WO 98/11690 A1 | 3/1998 |
| WO | WO 98/19431 A1 | 5/1998 |
| WO | WO 98/42098 | 9/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/49615 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/08909 A | 2/2000 |
| WO | WO 00/46994 A1 | 8/2000 |
| WO | WO 00/59152 | 10/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01 13198 A | 2/2001 |
| WO | WO 01/24530 A2 | 4/2001 |
| WO | WO 01/37209 A1 | 5/2001 |
| WO | WO 01/63528 | 8/2001 |
| WO | WO 2004/034223 A2 | 4/2004 |
| WO | WO 2004/103843 | 12/2004 |

OTHER PUBLICATIONS

Weber, R., "Digital Rights Management Technology" Oct. 1995.
Flasche, U. et al., "Decentralized Processing of Documents", pp. 119-131, 1986, Comput. & Grpahics, vol. 10, No. 2.
Mori, R. et al., "Superdistribution: The Concept and the Architecture", pp. 1133-1146, 1990, The Transactions of the IEICE, vol. E 73, No. 7, Tokyo, JP.
Weber, R., "Metering Technologies for Digital Intellectual Property", pp. 1-29, Oct. 1994, A Report to the International Federation of Reproduction Rights Organizations.
Clark, P.C. et al., "Bits: A Smartcard protected Operating System", pp. 66-70 and 94, Nov. 1994, Communications of the ACM, vol. 37, No. 11.
Ross, P.E., "Data Guard", pp. 101, Jun. 6, 1994, Forbes.
Saigh, W.K., "Knowledge is Scared", 1992, Video Pocket/Page Reader Systems, Ltd.
Kahn, R.E., "Deposit, Registration and Recordation in an Electronic Copyright Management System", pp. 1-19, Aug. 1992, Corporation for National Research Initiatives, Virginia.
Hilts, P. et al., "Books While U Wait", pp. 48-50, Jan. 3, 1994, Publishers Weekly.
Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.
O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.
Willett, S., "Metered PCs: Is Your System Watching You? Wave System beta tests new technology", pp. 84, May 2, 1994, InfoWorld.
Linn, R., "Copyright and Information Services in the Context of the National Research and Education Network", pp. 9-20, Jan. 1994, IMA Intellectual Property Project Proceedings, vol. 1, Issue 1.
Perrit, Jr., H., "Permission Headers and Contract Law", pp. 27-48, Jan. 1994, IMA Intellectual Property Project Proceedings, vol. 1, Issue 1.
Upthegrove, L., "Intellectual Property Header Descriptors: A Dynamic Approach", pp. 63-66, Jan. 1994, IMA Intellectual Property Proceedings, vol. 1, Issue 1.
Sirbu, M., "Internet Billing Service Design and prototype Implementation", pp. 67-80, Jan. 1994, IMA Intellectual Property Project Proceedings, vol. 1, Issue 1.
Simmel, S. et al., "Metering and Licensing of Resources: Kala's General Purpose Approach", pp. 81-110, Jan. 1994, IMA Intellectual Property Project Proceedings, vol. 1, Issue 1.
Kahn, R., "Deposit, Registration and Recordation in an Electronic Copyright Management System", pp. 111-120, Jan. 1994, IMA Intellectual Property Project Proceedings, vol. 1, Issue 1.
Tygar, J. et al., "Dyad: A System for Using Physically Secure Coprocessors", pp. 121-152, Jan. 1994, IMA Intellectual Property Project Proceedings, vol. 1, Issue 1.
Griswold, G., "A Method for Protecting Copyright on Networks", pp. 169-178, Jan. 1994, IMA Intellectual Property Project Proceedings, vol. 1, Issue 1.
Nelson, T., "A Publishing and Royalty Model for Networked Documents", pp. 257-259, Jan. 1994, IMA Intellectual Property Project Proceedings, vol. 1, Issue 1.
Robinson, E., "Redefining Mobile Computing", pp. 238-240, 247-248 and 252, Jul. 1993, PC Computing.
Abadi, M. et al., "Authentication and Delegation with Smart-cards", 1990, Research Report DEC Systems Research Center.
Mark Stefik, "Letting Loose the Light: Igniting Commerce in Electronic Publication", pp. 219-253, 1996, Internet Dreams: Archetypes, Myths, and Metaphors, IDSN 0-262-19373-6.
Mark Stefik, "Letting Loose the Light: Igniting Commerce in Electronic Publication", pp. 2-35, Feb. 8, 1995, Internet Dreams: Archetypes, Myths and Metaphors.
European Search Report dated Jun. 11, 2004.
European Search Report dated Apr. 26, 2004.
PCT International Search Report, date of mailing Jan. 14, 2003 (PCT/US02/17662).
International Search Report dated Feb. 11, 2004.
European Search Report dated Apr. 26, 2004 (European Patent Application No. 02 739 696.9).
Henry H. Perritt, Jr., "Technological Strategies for Protecting Intellectual Property in the Networked Multmedia Environment", Apr. 2-3, 1993, Knowbots, Permissions Headers & Contract Law.
Perritt, "Technologies Strategies for Protecting IP in the Networked Multimedia Environment", Apr. 2-3, 1993, Knowbot Permissions.
Delaigle, "Digital Watermarking", Spie Conference in Optical Security and Counterfeit Deterrence Techniques, San Jose, CA Feb. 1996, vol. 2659 pp. 99-110.
Delaigle, "Digital Watermarking," Spie Conference in Optical Security and Counterfeit Deterrance Techniques, San Jose, CA (Feb. 1996).
Perritt, "Technologies Strategies for Protecting Intellectual Property in the Networked Multimedia Environment," Knowbots, Permissions Headers and Contract Law (Apr. 2-3, 1993).
Blaze et al, "Divertible Protocols and Atomic Proxy Cryptography" 1998 Advances in Cryptography—Euro Crypt International Conference on the Theory and Application of Crypto Techniques, Springer Verlag, DE.
Blaze et al, "Atomic Proxy Cryptography" DRAFT (Online) (Nov. 2, 1997). XP002239619 Retrieved from the Internet.
No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive/2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (DRAFT), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 467-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptpsystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (DRAFT), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

* cited by examiner

RIGHTS OFFERING AND GRANTING

RELATED APPLICATION DATA

This application claims benefit from U.S. provisional application Ser. No. 60/296,113, filed in Jun. 7, 2001 the disclosure of which is incorporated herein by reference. This application also claims benefit from U.S. provisional application, Ser. No. 60/331,625 filed in Nov. 20, 2001, the disclosure of which is also incorporated herein by reference. This application also claims benefit from U.S. provisional application Ser. No. 60/331,624 filed on Nov. 20, 2001, the disclosure of which is also incorporated herein by reference. This application is also a continuation-in-part of application Ser. No. 09/867,745 filed on May 31, 2001, now U.S. Pat. No. 6,754,642 the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a method and system for digital rights management and, more particularly, to a method and system for automatically offering and granting rights over a communications network or other channels.

BACKGROUND OF THE INVENTION

The digital age has greatly increased concerns about ownership, access, and control of copyrighted information, restricted services and valuable resources. Rapid evolution and wide deployment has occurred for computers, and other electronic devices such as cellular phones, pagers, PDAs, and e-book readers, and these devices are interconnected through communication links including the Internet, intranets and other networks. These interconnected devices are especially conducive to publication of content, offering of services and availability of resources electronically.

One of the most important issues impeding the widespread distribution of digital works (i.e. documents or other content in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System. For example, authentication, authorization, accounting, payment and financial clearing, rights specification, rights verification, rights enforcement, and document protection issues should be addressed. U.S. Pat. Nos. 5,530,235, 5,634,012, 5,715,403, 5,638,443, and 5,629,980, the disclosures of which are incorporated herein by reference, disclose DRM systems addressing these issues.

Two basic DRM schemes have been employed, secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as Cryptolopes™ and Digiboxes™ fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as PC's and workstations using browsers to access the Web, will be the dominant systems used to access digital works. In this sense, existing computing environments such as PC's and workstations equipped with popular operating systems (e.g., Windows™, Linux™, and UNIX) and rendering applications, such as browsers, are not trusted systems and cannot be made trusted without significantly altering their architectures. Of course, alteration of the architecture defeats a primary purpose of the Web, i.e. flexibility and compatibility.

Some DRM systems allow content owners to specify usage rights and conditions, and associate them with content. These usage rights control how the recipient thereof can use the content. Usually after a content distributor or consumer has completed selecting and ordering specific content, the content is delivered either electronically from some content repository or via a conventional distribution channel to the recipient, such as tangible media sent via a common carrier. Corresponding DRM systems used by the recipient, for example the distributor or consumer, will then interpret the rights and conditions associated with the content, and use them to control how the content is distributed and/or used. Examples of usage rights include view, print and extract the content, and distribute, repackage and loan content. Associated conditions may include any term upon which the rights may be contingent such as payment, identification, time period, or the like.

U.S. Pat. No. 5,634,012, discloses a system for controlling the distribution of digital documents. Each rendering device has a repository associated therewith. A predetermined set of usage transaction steps define a protocol used by the repositories for enforcing usage rights associated with a document. Usage rights persist with the document content. The usage rights can permit various manners of use such as, viewing only, use once, distribution, and the like. Usage rights can be contingent on payment or other conditions.

However, there are limitations associated with the above-mentioned paradigms wherein only usage rights and conditions associated with content are specified by content owners or other grantors of rights. Once purchased by an end user, a consumer, or a distributor, of content along with its associated usage rights and conditions has no means to be legally passed on to a next recipient in a distribution chain. Further the associated usage rights have no provision for specifying rights to derive other rights, i.e. rights to modify, transfer, offer, grant, obtain, transfer, delegate, track, surrender, exchange, transport, exercise, revoke, or the like. Common content distribution models often include a multi-tier distribution and usage chain. Known DRM systems do not facilitate the ability to prescribe rights and conditions for all participants along a content distribution and usage chain. Therefore, it is difficult for a content owner to commercially exploit content unless the owner has a relationship with each party in the distribution chain.

SUMMARY OF THE INVENTION

A first aspect of the invention is a method for transferring usage rights adapted to be associated with items. The method comprises generating, by a supplier, at least one first offer containing usage rights and meta-rights for the item, said usage rights defining a manner of use for the items, said meta-rights specifying rights to derive usage rights or other meta-rights, presenting said offer to a first consumer, receiving a selection from the first consumer indicating desired usage rights and meta-rights, and generating a first license granting the desired usage rights and meta-rights to the first consumer.

A second aspect of the invention is a system for transferring usage rights adapted to be associated with an item to be licensed in multi-tier channels of distribution with downstream rights and conditions assigned at least one level. The system comprises a supplier component, comprising a supplier user interface module, an offer generator module for generating an offer containing at least usage rights and of meta-rights, a rights composer module for composing a draft license, and a repository for supplier's rights, a supplier management database. The system further comprises a consumer component comprising a consumer user interface module, an offer-consideration module configured to analyze the offers generated by the supplier component and select offers based on the analysis, and a repository for consumer's rights, a consumer management database.

A third aspect of the invention is a method for generating a license to digital content to be used within a system for at least one of managing use and distribution of the digital content. The method comprises presenting a consumer with an offer including meta-rights, receiving a selection by the consumer of at least one meta-right in the offer, generating a license based on the selection, wherein the license permits the consumer to exercise the at least one meta-right and permits the consumer to offer at least one derived right derived from the at least one meta-right and generate a license including the at least one derived right.

BRIEF DESCRIPTION OF THE DRAWING

Exemplary embodiments of this invention will be described in detail, with reference to the attached drawing in which.

DETAILED DESCRIPTION

Prior to providing detailed description of the apparatus and method for offering and granting rights, a description of a DRM system that can be utilized to specify and enforce usage rights and meta-rights for specific content, services, or other items is first described below.

Figure 9:
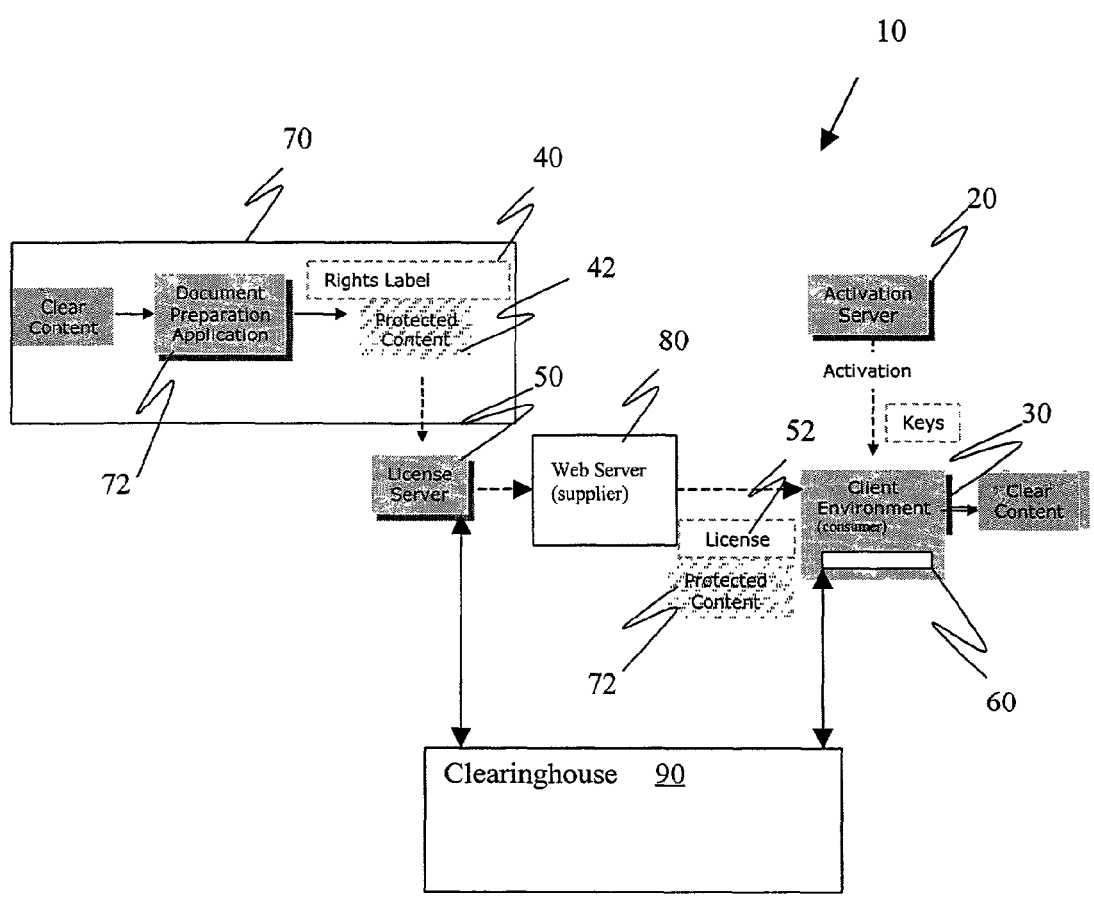
FIG. 9 is block diagram of a DRM system that may be utilized in connection with the preferred embodiment.

FIG. 9 illustrates DRM System 10 that includes a user activation component, in the form of activation server 20, that issues public and private key pairs, or other identification mechanisms, to content users in a protected fashion, as is well known. Typically, when a user uses DRM system 10 for the first time, the user installs software that works with, or includes, a rendering application for a particular content format. The software is installed in client environment 30, a computer associated with the content recipient, for example. The software is part of DRM 10 system and is used to enforce usage rights for protected content. During the activation process, some information is exchanged between activation server 20 and client environment 30. Client component 60 preferably is tamper resistant and contains the set of public and private keys issued by activation server 20 as well as other components, such as rendering components for example.

Rights label 40 is associated with content 42 and specifies usage rights and meta-rights that are available to a recipient, i.e. a consumer of rights, when corresponding conditions are satisfied. License Server 50 manages the encryption keys and issues licenses 52 for protected content 42. Licenses 52 embody the actual granting of rights, including usage rights and meta-rights, to an end user. For example, rights offer 40 may permit a user to view content for a fee of five dollars and print content for a fee of ten dollars, or it may permit a user to offer rights to another user, for example, by utilizing the concept of meta-rights described below. License 52 can be issued for the view right when the five dollar fee has been paid. Client component 60 interprets and enforces the rights, including usage rights and meta-rights, that have been specified in the license. Rights label 40 and license 52 are described in detail below.

Figure 11:
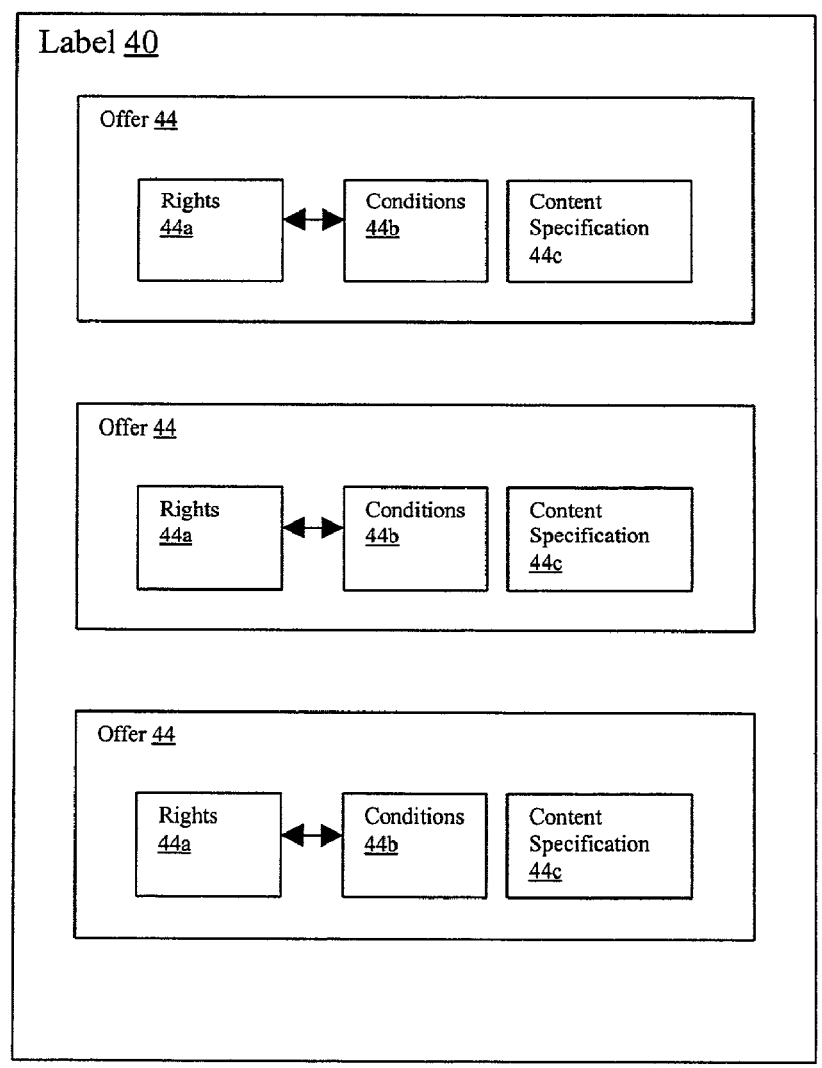
FIG. 11 is a schematic illustration of a rights label of the preferred embodiment.

FIG. 11 illustrates rights label 40 in accordance with the preferred embodiment. Rights label 40 includes plural rights options 44. Each rights option 44 includes usage rights 44a, conditions 44b, and content specification 44c. Content specification 44c can include any mechanism for referencing, calling, locating, or otherwise specifying content 42 associated with rights offer 44.

Figure 10:
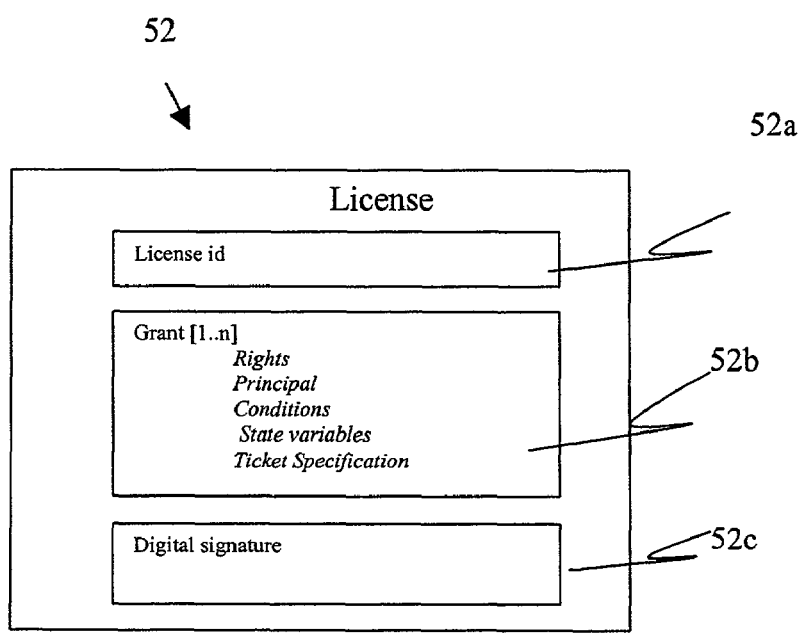
FIG. 10 is a block diagram of an exemplary structure of a license containing usage rights and meta-rights of the preferred embodiment.

As shown in FIG. 10, license 52 includes license 52a, grant 52b, and digital signature 52c. Grant 52b includes granted usage rights and/or meta-rights selected from label. The structure of the grant also includes one or more principals, to whom the specified usage rights and/or meta-rights are granted, a list of conditions, and state variables required to enforce the license. Like usage rights, access and exercise of the granted meta-rights are controlled by the condition list and state variables as described below.

Clear (unprotected) content can be prepared with document preparation application 72 installed on computer 70 associated with a content publisher, a content distributor, a content service provider, or any other party. Preparation of content consists of specifying the usage rights, meta-rights, and conditions under which content 42 can be used and distributed, associating rights label 40 with content 42 and protecting content 42 with some crypto algorithm. A rights language such as XrML™ can be used to specify the rights and conditions. However, the usage rights and meta-rights can be specified in any manner. Also, the rights can be in the form of a predefined specification or template that is merely associated with the content. Accordingly, the process of specifying rights refers to any process for associating rights with content. Rights label 40 associated with content 42 and the encryption key used to encrypt the content can be transmitted to license server 50.

Rights can specify transfer rights, such as distribution rights, and can permit granting of rights to others or the derivation of rights. Such rights are referred to as "meta-rights". Meta-rights are the rights that one has to manipulate, modify, or otherwise derive other meta-rights or usage rights. Meta-rights can be thought of as usage rights to usage rights. Meta-rights can include rights to offer, grant, obtain, transfer, delegate, track, surrender, exchange, and revoke usage rights to/from others. Meta-rights can include the rights to modify any of the conditions associated with other rights. For example, a meta-right may be the right to extend or reduce the scope of a particular right. A meta-right may also be the right to extend or reduce the validation period of a right.

Often, conditions must be satisfied in order to exercise the manner of use in a specified right. For, example a condition may be the payment of a fee, submission of personal data, or any other requirement desired before permitting exercise of a manner of use. Conditions can also be "access conditions" for example, access conditions can apply to a particular group of users, say students in a university, or members of a book club. In other words, the condition is that the user is a particular person or member of a particular group. Rights and conditions can exist as separate entities or can be combined.

State variables track potentially dynamic states conditions. State variables are variables having values that represent status of an item, usage rights, license or other dynamic conditions. State variables can be tracked, by clearinghouse 90 license or server 30 another device, based on identification mechanisms in license 52. Further, the value of state variables can be used in a condition. For example, a usage right can be the right to print content 42 three times. Each time the usage right is exercised, the value of the state variable "number of prints" is incremented. In this example, when the value of the state variable is three, the condition is not longer satisfied and content 42 cannot be printed. Another example of a state variable is time. A condition of license 52 may require that content 42 is printed within thirty days. A state variable can be used to track the expiration of thirty days. Further, the state of a right can be tracked as a collection of state variables. The collection of the change is the state of a usage right represents the usage history of that right.

A typical workflow for DRM system 10 is described below. A recipient, such as a user, operating within client environment 30 is activated for receiving content by activation server 20. This results in a public-private key pair (and some user/ machine specific information) being downloaded to client environment 30 in the form of client software component 60 in a known manner. This activation process can be accomplished at any time prior to the issuing of a license.

When a user wishes to use protected content 42, the user makes a request for the content 42. For example, a user might browse a Web site running on Web server 80 associated with a grantor of rights such as a content distributor, using a browser installed in client environment 30, and attempt to download protected content 42. During this process, the user may go through a series of steps possibly including a fee transaction (as in the sale of content) or other transactions (such as collection of information). When the appropriate conditions and other prerequisites, such as the collection of a fee and verification that the user has been activated, are satisfied, Web server 80 contacts license server 50 through a secure communications channel, such as a channel using a Secure Sockets Layer (SSL). License server 50 then generates license 52 for the content and Web server 80 causes both protected content 42 and license 52 to be downloaded. License 52 can be downloaded from license server 50 or an associated device. Content 42 can be downloaded from computer 70 associated with a publisher, distributor, or other party.

Client component 60 in client environment 30 will then proceed to interpret license 52 and allow use of content 42 based on the rights and conditions specified in license 52. The interpretation and enforcement of usage rights are well known generally. The steps above may take place sequentially or approximately simultaneously or in various order.

DRM system 10 addresses security aspects of protecting content 42. In particular, DRM system 10 may authenticate license 52 that has been issued by license server 50. One way to accomplish such authentication is for application 60 to determine if the licenses can be trusted. In other words, application 60 has the capability to verify and validate the cryptographic signature of digital signature 52c, or other identifying characteristic of the license. During the activation step described above, both client environment 30 and license server 50 receive a set of keys in a tamper-resistant software "package" that also includes other components, such as the necessary components for activated client environment 30 to verify signature 52 of license 52 in a known manner. Of course, the example above is merely one way to effect a DRM system. For example, the license and content can be distributed from different entities. Also, rights offer 40 can be associated with content by a party other than the party preparing the content. Also, clearinghouse 90 can be used to process payment transactions and verify payment prior to issuing a license.

For any set of rights, there are two kinds of entities involved, the "supplier" and the "consumer". The function of the supplier is to offer, and possibly grant, the rights, and the function of the consumer is to select, and possibly exercise the rights. Both the supplier and consumer may actually represent two or more entities. In general, multiple entities may collectively make an offer and grant rights to multiple entities. The supplier and consumer represent any two entities in the content value chain that have a direct relationship with each other regarding the granting of rights. At the beginning of the value chain, the supplier and consumer may be author and publisher. Going down along the value chain, the supplier and consumer may be a publisher and another publisher (for content aggregation), a publisher and distributor (for content distribution), a distributor and another distributor (for multi-tier content distribution), a distributor and a retailer (for content retailing), a retailer and a consumer (for content consumption), and a consumer and another consumer (for content supper-distribution or personal lending).

An "offer of rights" or "rights offer" expresses how a consumer (e.g. a content distributor or user) can acquire a particular instance of content together with its associated usage rights and/or meta-rights. An offer may or may not contain financial terms. An offer is an expression of mere willingness to commerce negotiation and also an expression of willingness to grant on terms stated. An offer may be expressed in the form of a rights label. A "consideration of rights" is a process as part of the rights granting in which the rights consumer has examined the rights being offered and possibly bargained them and associated terms and conditions. A "choice of rights" is a selection of rights and their associated terms and conditions from a rights offer. It indicates the intent of the consumer to accept these rights and the corresponding terms and conditions. For example, selection can comprise selecting one option 44 from label 40. "Customization of rights" is a process as part of the rights granting in which the rights supplier assembles rights and terms and conditions based on a choice of the rights consumer. The output of this process can be a draft license to be accepted by the rights consumer. A "license of rights" is an expression of rights and possibly conditions accepted and agreed upon by the rights supplier and consumer. It is the output of the rights offering and granting process. A license is a grant to exercise the rights that govern the usage (possibly including further distribution) of content or other items.

As described above, a rights label, such as rights label 40, may contain a number of options 44 allowing the consumer to make a selection and conduct negotiation (if permitted), while license 52 contains rights the consumer has selected and accepted. Note that the accepted rights may include a right to present offers to others or make selections of offers.

Figure 1:
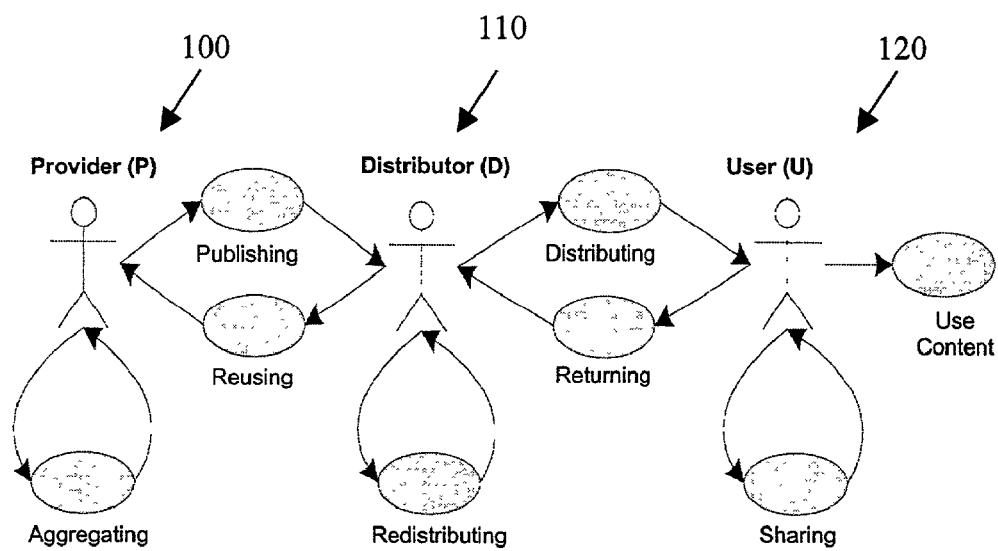
FIG. 1 is a schematic diagram of a three-tier model for content distribution.

An example of a distribution chain model is illustrated in FIG. 1. The distribution chain includes a content provider 100, distributor 110, and end user 120. Of course content may be prepared in the manner described above. It is assumed that the content has already been prepared in the model of FIG. 1. FIG. 1 is directed to the transfer of content and shows that, in this example, provider 100 may publish content to distributor 110 or receive content for reuse from distributor 110. Distributor 110 may in turn distribute content to user 120 or receive returned content form user 120. User 100 can use content. To further illustrate the potential complexities of multi-tier distribution chains provider 100 can aggregate content from others, distributor 110, can receive content from other distributors for redistribution, and user 120 can share content with the other users. It is clear that there are plural stages in the content life cycle and plural relationships between the various parties. A precise and consistent specification of rights at the different stages of the life cycle and relationships is important and crucial to persistent protection of content in multi-tier distribution and usage.

Figure 2:
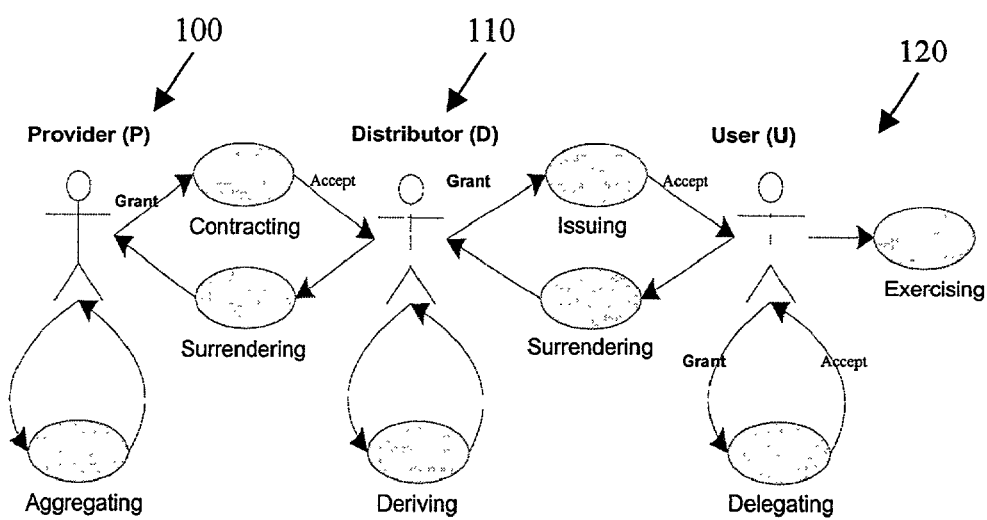
FIG. 2 is a schematic diagram illustrating rights offering and granting processes in the model of FIG. 1.

FIG. 2 illustrates the flow of rights in the same model, including rights generating, aggregating, issuing, relinquishing, driving, granting, surrendering, delegating and exercising. The model of FIG. 2 includes the same entities, provider 100, distributor 110, and user 120. It can be seen that, with respect to the flow of rights, each party can grant and accept rights. User 120 can grant and accept rights from other users, a process called "delegation", in this example.

The model of FIG. 2 covers many specific content publishing, distribution and use relationships. Other models can be derived from on this model by a different consolidation or segregation of the parties. For example, every provider can be a distributor. This is "direct publishing", which allows individual authors to distribute/sell their content without any intermediate publisher. Further, every consumer can be a potential distributor. This allows consumers to pass content to each other. This includes supper-distribution, gifting, and personal lending. In a "Web community" and everyone is able to publish, distribute and consume content. "Content aggregation" allows publishers to compose content from other publishers into composite works. Site license and enterprise use allows sharing content among consumers.

Figure 3A:
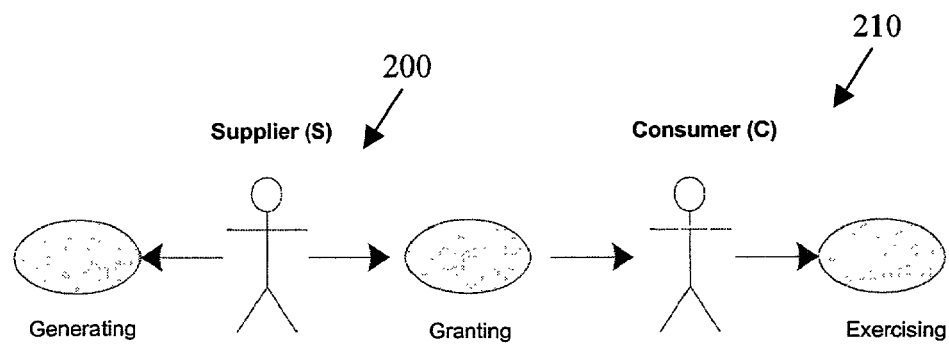
FIG. 3(a) is a schematic diagram of a simple supplier-consumer push model for rights generating, issuing and exercising.
Figure 3B:
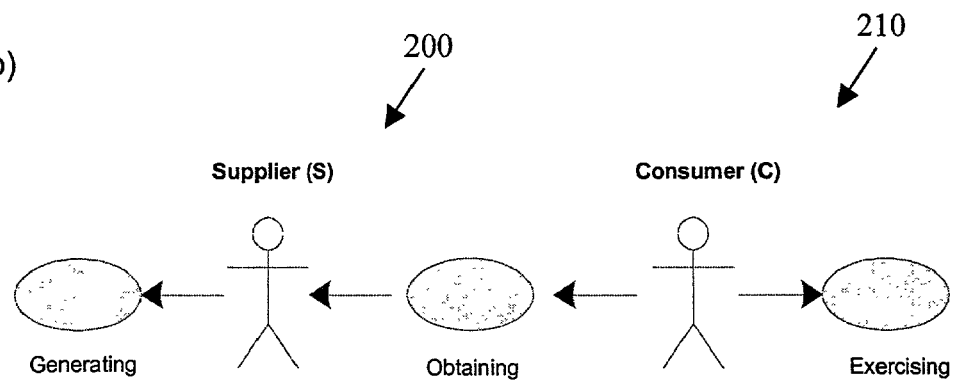
FIG. 3(b) is a schematic diagram of a simple supplier-consumer pull model for rights generating, issuing and exercising.

In general, all the rights relationships shown in FIG. 2 can be captured by two generic supplier-consumer models, as shown in FIGS. 3(a) and 3(b). FIG. 3(a) shows a "push" model and FIG. 3(b) shows a "pull" model. In the push model shown in FIG. 3(a), rights supplier 200 initiates the rights offering and granting process by generating an offer and granting the rights to the rights consumer 210. In the pull model shown in FIG. 3(b), rights consumer 210 initiates the process by requesting an offer and accepting the rights from the rights supplier 200.

Figure 4:
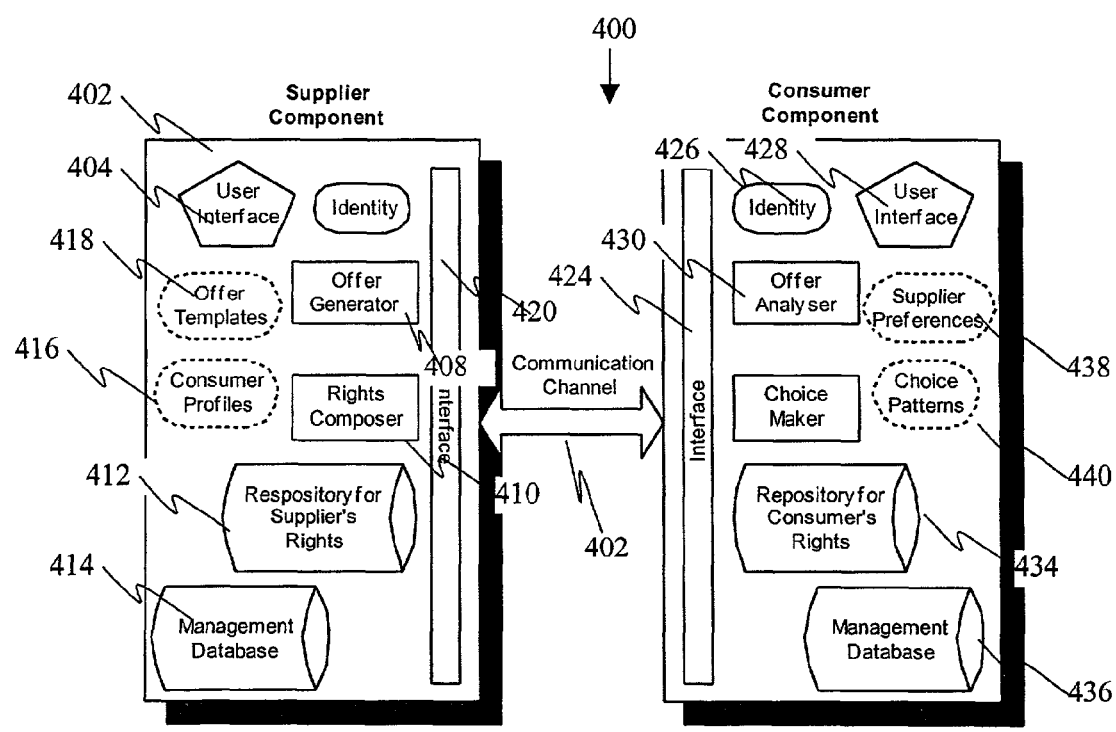
FIG. 4 is a block diagram of a rights offering-granting architecture in accordance with the preferred embodiment.

An architecture of the preferred embodiment for rights offering and granting is shown in FIG. 4. Architecture 400 can be implemented as a combination of computer hardware and software and includes rights supplier component 402, rights consumer component 438 and communication channel 422 linking these two components. For example, communication channel 42 can be Internet, a direct computer to computer connection, a LAN, a wireless connection or the like. Supplier component 402 is associated with the supplier, i.e. the entity making rights available to a consumer who is the entity going to exercise, i.e., consume the rights. The supplier could be the content owner or provider, or could be a distributor or any "middle-man," such as a retailer or operator of a web site. Consumer component 438 is associated with the consumer who could be the ultimate user (i.e., content consumer) or a "middle-man," such as a retailer, whole-seller, or reseller. Keep in mind that the consumer consumes rights and does not necessarily use (i.e. consume) the content. Both supplier component 402 and consumer component 438 can embody any type of hardware devices, and or software modules, such as a personal computer, a handheld computer, a mobile phone a server, a network, or any combination of the same. Supplier component 402 generates rights label 40 as offers, presents draft licenses and grants license 52 to the consumer. Consumer component 438 issues requests, select choices of options 44 from rights labels 40, generates counter offers, and accepts licenses 52. Supplier component 402 and consumer component 438 can be embodied in the same device(s) and communication channel 422 can be an internal channel.

Supplier component 402 contains user interface module 404, communication interface module 420 identity module 406 repository 412 for supplier's rights (e.g., in the form of issued licenses) and database 414 for management related information. User interface 404 accomplishes presentation to the user of the component functions and acceptance of user interactions in a known manner. Communication interface 422 provides the proper formatting and protocols for messages between supplier component 402 and consumer component 438. Identity module 406 ensures that the identity of supplier component 402 can be authenticated by consumer component 438 and may contain authentication information like a password, cryptographic keys or biometric information of the user of supplier component 402. Rights repository 412 stores rights granted to the user of supplier component 402 and may include functions for indexing, searching and updating the rights stored within. Management database 414 is used to archive information generated during the rights offering and granting processes. Such information includes information related to initial offers, consumer choices, possible counter-offers, agreements and final licenses.

Consumer component 438 includes user interface module 428, communication interface module 424, identity module 426, repository 434 for consumer's rights (e.g., in the form of issued licenses), and database 436 for management related information. User interface 424 deals handles presentation to the user of the component and acceptance of user interactions. Communication interface 422 provides the proper formatting and protocols for rights offering and granting messages between supplier component 402 and consumer component 438. Identity module 426 ensures that the identity of the consumer component 438 can be authenticated by supplier component 402 and may contain authentication information like a password, cryptographic keys or biometric information of the user. Rights repository 434 stores rights granted to the user of consumer component 438 and may include functions for indexing, searching and updating the rights stored within. Management database 436 is used to archive information generated during the rights offering and granting process. The information includes that related to offers 44, consumer choices, possible counter-offers, agreements and licenses 52. Note that database 436 can store information that is the same as or different from database 414 because the parties may interact with other parties and thus have different archived information.

Supplier component 402 also includes offer generator module 408 for generating offers, rights composer module 410 for composing licenses, offer templates module 418 for providing templates for generating offers based on previous transactions and common formality of offers, and consumer profiles module 416 for customizing and granting rights based on past consumer characteristics and relationships.

Consumer component 438 also includes offer analyzer module 430 for understanding rights and their terms and conditions presented within offers, a choice maker module 432 for selecting favorable options specified in offers, a supplier preference module 438 for describing any preferred suppliers based on past and existing supplier characteristics and relationships, and choice patterns module 440 for providing patterns and interests in selection options in offers. For example, the choice pattern module 440 may include a list of preferred suppliers or a list of lowest prices for the item of interest to the consumer. Offer analyzer module 430 and choice maker module 432, respectively, may be combined into one module.

The process of offering and granting rights within architecture 400 is based on protocols followed by supplier component 402 and consumer component 438. These protocols generally consist of an offer and acceptance of that offer. Specifically, the protocols include an offering of rights by one party to another and acceptance of that offer by the person to whom it is made. An offer, once made, may be styled so that it may revoked before acceptance or the offeror could styled it so that it cannot be revoked at all or only under certain circumstances definable by the offeror. An offer can also expire in various way, for example if a deadline for acceptance passes. If there is no specified deadline, then the offer could expire in a predetermined reasonable time, depending on the subject matter of the offer. For periodically available content such as magazines, journals, and even newspapers, a reasonable time could be accord to the period of the content publication, for example. For dynamically generated or provided content such as streaming content, a reasonable time could be any time before the availability of the content. The rights supplier can dictate other terms of the acceptance, to which the rights consumer is bound. For example, the offer may require acceptance in sending back in a certain form via an email or through a certain web page interface.

Figure 5A:
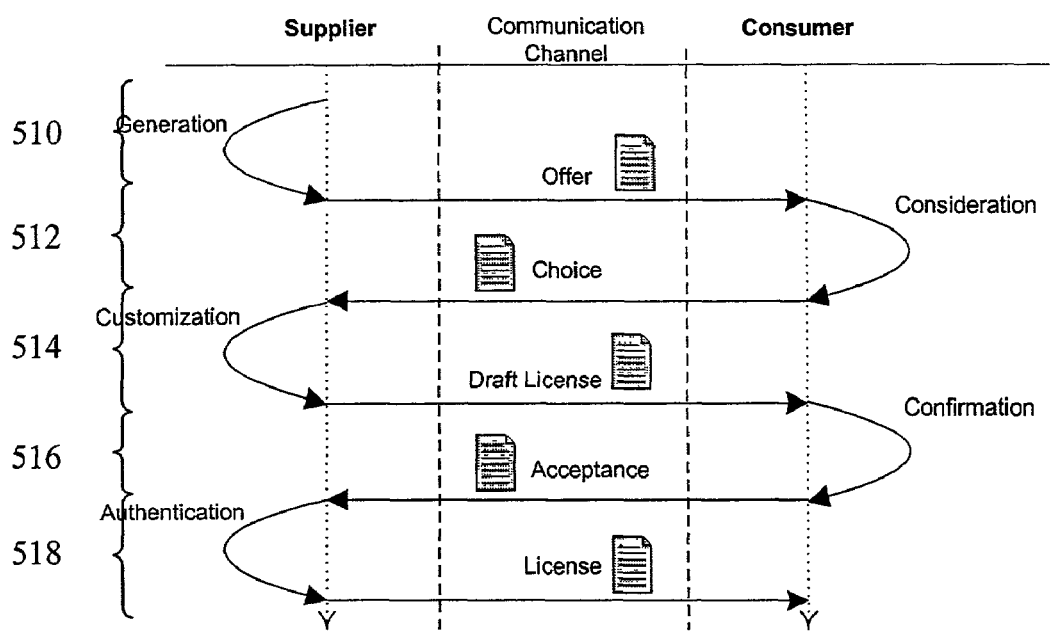
FIGS. 5a and 5b are workflow diagrams for examples of offering and granting rights between a rights supplier and a rights consumer with a push and pull model respectively.
Figure 5B:
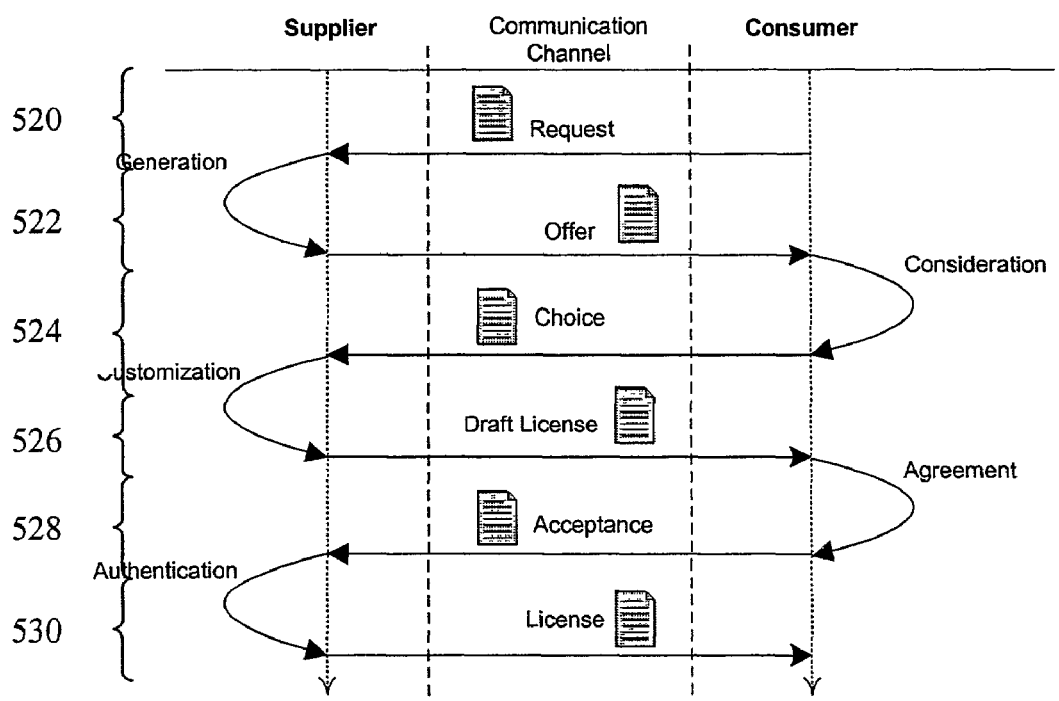

FIG. 5(*a*) illustrates the workflow of protocol 500 of a push model for rights granting. Supplier component 402 generates an offer of rights in the form of rights label 40 for example, with possibly many options 44, and sends it to consumer component 438 (510). Consumer component 438 considers the offer and its possible options, and responds to supplier component 402 with a choice of any of the optional rights offer 44 (512). Supplier component 402 customizes rights according to the consumer's response, and issues the rights the user of consumer component 432 (514) in the form of a draft license.

Consumer component 438 then accepts the draft license if it corresponds to the choice made and is otherwise acceptable (516). Upon acceptance, supplier component 402 generates license 52 and transmits license 52 to consumer component (518). Keep in mind that grant 52b of license 52 can include usage rights and/or meta-rights. Therefore license 52 can permit the user of consumer component 438 to grant rights to others in a similar fashion. However, the derivable rights are controlled by upstream parties through the use of meta-rights. Additionally, the protocol can include steps where supplier component 402 requests to make payment through a credit card of the user of consumer component 438, and the user component 402 provides the information and authorizes the charge. Both supplier component 402 and consumer component 438 can generate status reports on success or failure of the process. Further, parties can authenticate each other during the process and maintain authentication through the process.

FIG. 5(*b*) shows a protocol of pull model for rights granting. First, consumer component 438 sends a request to supplier component 402 to indicate an interest in obtaining certain rights in content (520). Supplier component 402 then responds with an offer, in the form of label 40 having plural offer options 44, covering the rights requested by consumer component 438, and sends the offer to consumer component 438 (522).

Consumer component 438 then considers the offer and its options, and responds to supplier component 402 with a choice of one of the offer options (524). Supplier component 402 customizes rights according to the response, and grant the rights to the consumer in the form of a draft license (526). Consumer component 438 then accepts the draft license (528) and supplier component 402 issues license 52 granting rights to consumer component 438 (530). Once again the rights can include meta-rights.

Figure 6:
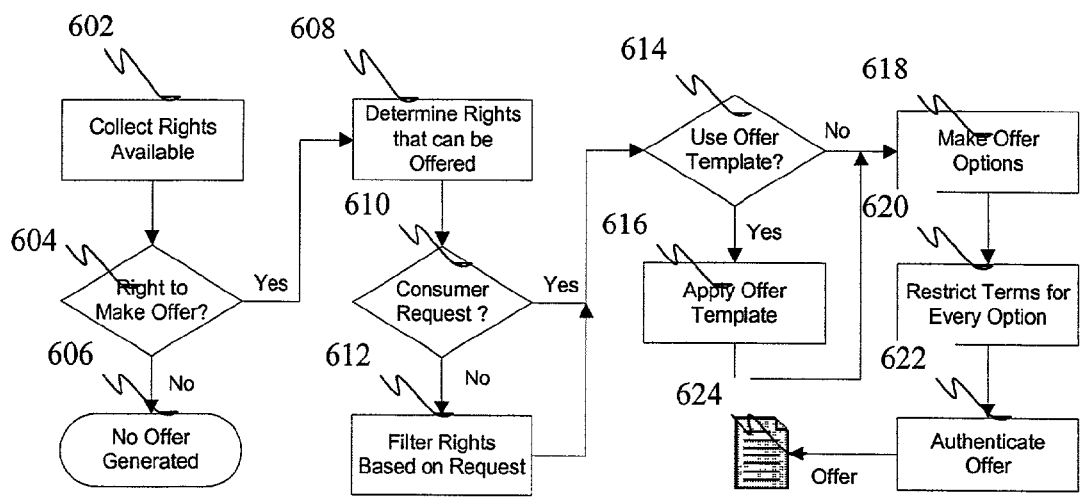
FIG. 6 is a flow chart of a rights offer generation process in accordance with the preferred embodiment.

FIG. 6 illustrates the offer generation process 600 performed by offer generator module 408 in supplier component 402. In offer generation process 600, available rights are first collected in block 602. Rights may be available from a previous supplier by being derived from meta-rights granted to the supplier or may be originally created rights. In step 604 it is determined whether supplier has a right to make an offer to the consumer. For example, if the consumer is known to be a minor and the content is restricted to an adult consumer or if the consumer is on a list of those prohibited from receiving content, the supplier may not make an offer. In such case, the offer generation process terminates in step 606. If the supplier has the right to make an offer, the process then determines all the rights that can be offered to the consumer in step 608 by parsing the rights collected in step 602. Next, in step 610, the process determines whether the consumer has requested any specific rights. If a request has been received, the process further filters the determined rights that can be offered, taking the received consumer requested rights into consideration and comparing them to the available rights. Then, the process determines whether an offer template needs to be applied in steps 614.

For example, the consumer might be offered standard rights included in the template, such as printing right, archiving right, etc. of the content. If an offer template is available and needed, the offer template is then applied in steps 616. In steps 618, human intervention may be provided to further make adjustments to the offer template or to any of the rights that are available for offering thus far in the process. Next, restrictions can be applied, through conditions and/or state variables. For example, a time restriction may be place on certain rights in step 620. Finally, a digital signature or other authentication is provided with the collection of rights to be offered in step 622 and an authenticated offer, in the form of rights label 40 is made in step 624 and presented to consumer component 438 in step 624.

Figure 8:
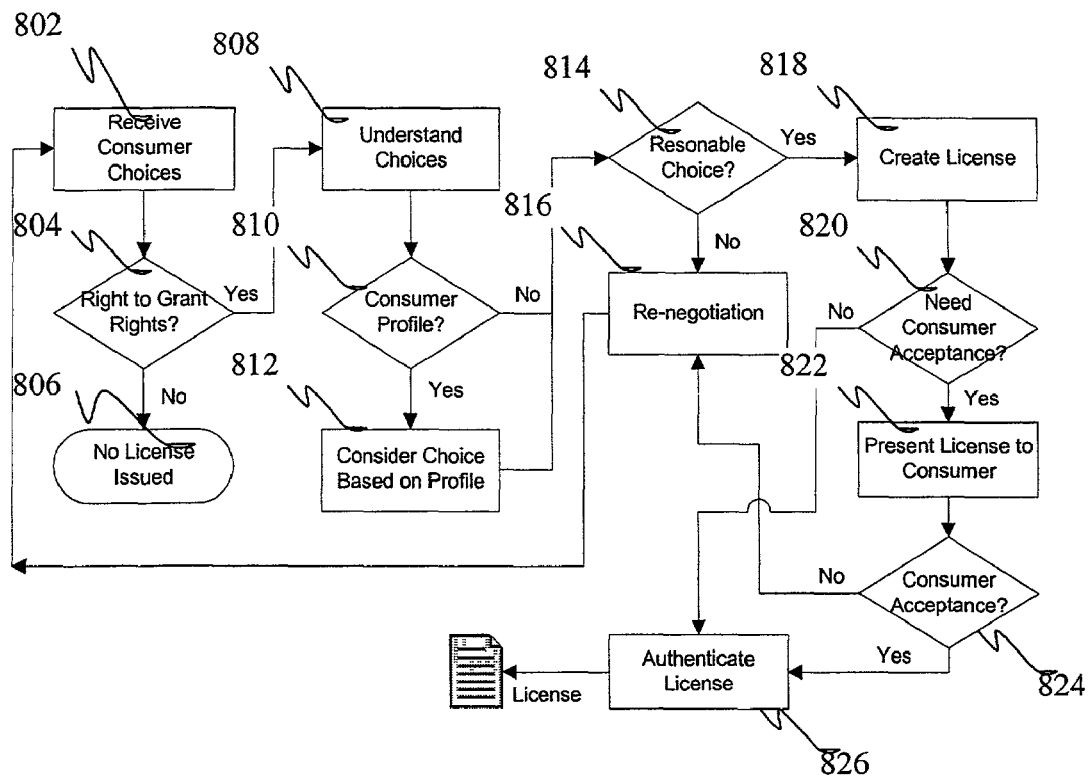
FIG. 8 is a flow chart of a rights offer customization process in accordance with the preferred embodiment.

FIG. 8 illustrates rights customization process 800 which is performed by rights composer module 410 in supplier component 402. Initially, consumer's choices are received in step 802. Choices are rights and conditions of an option 44 selected label 40 of step 624 (FIG. 6). The process then determines if supplier component 402 has the right to grant rights to consumer component 438 in step 804. For example, if the consumer fails to meet a certain requirement, such as minimum age or proof of residence in a locale where content may be licensed, for example, granting a license may not be proper, and the rights customization process 800 terminates in step 806. Otherwise, consumer selected choices are analyzed in step 808 to ascertain if they are an discernible by supplier component 402. For example, the choices can be parsed to see if they are understandable.

Next, the process determines if consumer information is available in step 810. For example, consumer profiles may be stored in database 414 (FIG. 4). If available, the consumer information is taken into consideration in step 812 for further analysis of consumer choices. In step 812, dynamic information can also considered as described below. For example, the profile may include a trust rating or address of the consumer that renders it desirable of undesirable to provide certain rights. The process then determines if the choices are reasonable in step 814. This determination may be carried out, for example, computationally or with human intervention. If the customer's choices are deemed unreasonable, re-negotiation of the customer's choices is then performed in block 816. In this re-negotiation process, the customer is presented with a new proposed offer based on the previously analyzed choices, the customer is given an opportunity to submit new choices offered, and the right customization process 800 begins again in step 802. Otherwise, a license including the selected rights is created in step 818.

After a license is created, if consumer acceptance is necessary (step 820), it is presented to the consumer for review in step 822. If the consumer does not agree with the terms in the license in step 824, re-negotiation is then initiated in step 816, which re-starts the rights customization process 800 again in step 802. In step 820, if a review by the consumer is not required, then the license is authenticated in step 826 to create a completed license 52 in step 828 which is to be issued and associated with content 42.

Figure 7:
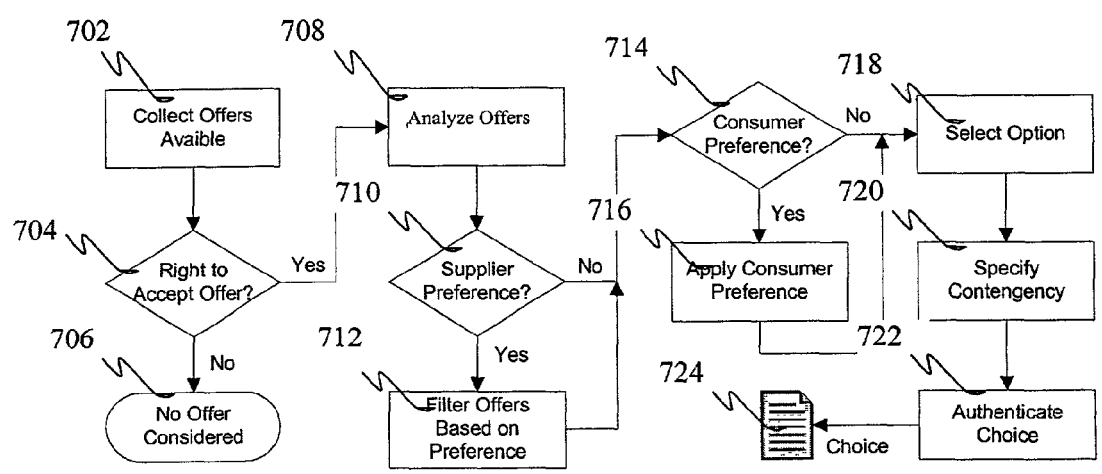
FIG. 7 is a flow chart of a rights offer consideration process in accordance with the preferred embodiment.

FIG. 7 illustrates offer consideration process 700 which is performed by offer analyzer module 430 and choice maker module 432 of consumer component 438. Available offers are first collected in step 702. In step 704, process 700 determines whether it has a right to accept offers from the supplier. For example, if the consumer certain restrictions on the purchase of content, such as an age restriction or a restriction against accepting content from outside an enterprise, the consumer may not accept an offer. In such a case, the offer consideration process terminates in step 706. If the consumer has the right to accept offers from the supplier, the offers are then analyzed in step 708 to ascertain if they are discernible. If it is determined that supplier preferences are available in step 710, the offers are filtered in step 712 based on the preferences. For example, the consumer may trust a specific supplier, or otherwise prefer transactions with that supplier, more that other suppliers. Next, step 714 determines if consumer preferences are available and, if so, they are applied in step 716 to the offers. Once all the offers are analyzed, by applying the logic of steps 708-714 and any other desired logic, the consumer then selects options in block 718 and specifies contingencies in block 720. The selection of options can be done automatically. If human intervention is desired, the customer can intervene and further specify additional choices or conditions desired. Any preferences, rules, or other logic can be used to analyze offers.

Overall, as can be seen in the description of FIGS. 6, 7, and 8 above, the consumer sends a request, and then a license is constructed. Either the supplier or the consumer could draft the content of the license, but in the example above the supplier does so. The request is a subset of an offer and the offer has one or more options. The supplier makes the offer available to the consumer sending the request (and to other consumers if that is the desire), and the consumer (including other consumers, if applicable) makes choices. Then, the supplier analyzes the choices, and constructs the license (i.e. a grant of rights). Note that the request can also be rejected, or a counter proposal could be made and the same process could then repeat for the counter proposal.

Also, when the supplier analyzes the request, the analysis may be done automatically, or with human intervention. When the consumer considers the offer, the choice or acceptance may be done automatically, or with human intervention. Either the offer or a license, or both, may be generated based on the dynamic information, the consumer's information, and the consumer's request, such as described above.

The dynamic information may include many kinds of information including information related to pricing, status of the network, the traffic of a web site at each moment of time, discounts given, coupons given, the habits of the consumer, how many times the content has been used, for how long the content was used, where it was used, or the like. The dynamic information can be tracked as state variables and the values of the state variables can be checked and updated as necessary.

Dynamic information is information capable of being (although, it need not actually be) changed or created by or by reference to a non-static element. For example, the dynamic information can be obtained based on a formula, database, curve, predetermined table, percentage of a value, a function, reference to other data, such as the prime rate of interest or the change in a stock market index, and/or by a human intervention of the user or distributor, and/or consumer's input.

The consumer's information may include information such as the age of the consumer, the credit history of the consumer, the credit limit of the consumer, income of the consumer, what kind of rights or licenses obtained, the password of the consumer, the key assigned to the consumer, club membership for access or discount, the class of the consumer based on a predetermined criteria, or any other data, identification characteristics and information. The supplier's information may include some or all of the subjects of information as the consumer's information, and may also include, for example, available options or variations, suppliers, shipping information, and other information.

The system and processes disclosed in this invention support multi-tier and super distributions of content. The following is a use case that shows how this can be modeled and supported. It illustrates the process of offering and granting rights by showing the process of transforming offered rights to a rights supplier (the content distributor in this case) to granted rights to a rights consumer (the end user in this case). It specifically shows how an offer is generated from an existing license, how this offer is considered with a choice, and how a final license is issued. Meta-rights provide a mechanism for permitting the transfer of rights from one party to the next party in a content distribution chain.

Suppose that a content provider P of some content C wants to specify that a distributor D may sell, to any end user within the region of the United States (US), the "play" right at a flat rate of $1 and the "print" right at a cost of $4 per copy (both are paid by D to P). The provider also allows the content distributor to add its own conditions to the "play" and "print" rights it issues to end users.

A license from the content provider to the distributor may resemble the following using the XrML™ rights language.

```
<license>
    <grant>
        <forAll varName="user"/>
        <forAll varName="distributorConditionForPlay"/>
        <principal id="distributor"/>
        <issue/>
        <grant>
            <principal varRef="user"/>
            <play/>
            <digitalResource licensePartId="book"/>
            <allCondition>
                <region regionCode="US"/>
                <condition varRef="distributorConditionForPlay"/>
            </allCondition>
        </grant>
        <fee>
            <flat currencycode="USD">1</flat>
            <to licensePartId="provider"/>
        </fee>
    </grant>
    <grant>
        <forAll varName="user"/>
        <forAll varName="distributorConditionForPrint"/>
        <principal id="distributor"/>
        <issue/>
        <grant>
            <principal varRef="user"/>
            <play/>
            <digitalResource licensePartId="book"/>
            <allCondition>
                <region regionCode="US"/>
                <condition varRef="distributorConditionForPrint"/>
            </allCondition>
        </grant>
        <fee>
            <perUse regionCode="USD">5</perUse>
            <to licensePartId="provider"/>
        </fee>
    </grant>
    <issuer id="provider">
</license>
```

The distributor may make an offer to the end user based on the rights it has as expressed in the license above. Note that usage rights and conditions of each option are set forth as XML™ elements between <grant> tags. In the following offer, note that the distributor adds a fee condition for getting the "play" right, charging the end user $2 ($1 more than it pays to the provider), and another fee condition for the "print" right, charging the end user $6 per print copy ($1 more than it pays to the provider). The distributor also limits the offer to an acceptance time period (up to Dec. 31, 2002). Meta rights granted to the distributor permit the distributor to modify the grant in the license, as described above, and make the offer.

```
<offer>
    <grant>
        <forAll varName="user"/>
        <principal varRef="user"/>
        <obtain/>
        <grant>
            <principal varRef="user"/>
            <play/>
            <digitalResource licensePartId="book"/>
            <region regionCode="US"/>
        </grant>
        <fee>
            <flat currencyCode="USD">2</flat>
            <to licensePartId="distributor"/>
        </fee>
    </grant>
    <grant>
        <forAll varName="user"/>
        <principal varRef="user"/>
        <obtain/>
        <grant>
            <principal varRef="user"/>
            <print/>
            <digitalResource licensePartId="book"/>
            <allCondition>
                <region regionCode="US"/>
                <fee>
                    <perUse currencyCode="USD">6</perUse>
                    <to licensePartId="distributor"/>
                </fee>
            </allCondition>
        </grant>
    </grant>
    <issuer id="distributor">
        <validityInterval>
            <until>2002:12:31</until>
        </validityInterval>
    </issuer>
</offer>
```

When the offer is presented to an end user, the end user may choose to get only the right to "play" for the flat fee of $2 and responds to the distributor with a choice set forth as an XML™ element between <choice> tags as follows.

```
<choice>
    <grant>
        <principal id="anEndUser"/>
        <obtain/>
        <grant>
            <principal id="anEndUser"/>
            <play/>
            <digitalResource licensePartId="book"/>
            <region regionCode="US"/>
        </grant>
        <fee>
            <flat currencyCode="USD">2</flat>
            <to licensePartId="distributor"/>
        </fee>
    </grant>
    <issuer id="anEndUser">
        <validityInterval>
            <until>2002:12:31</until>
        </validityInterval>
    </issuer>
</choice>
```

Note that the request can also be rejected. Note also that a response can also be constructed as a counter offer for rights not originally offered by the distributor. When the distributor receives the choice from the end user, it then issues a license to the user as shown below.

```
<license>
    <grant>
        <principal id="anEndUser"/>
        <obtain/>
        <grant>
            <principal id="anEndUser"/>
            <play/>
            <digital Resource licensePartId="book"/>
            <region regionCode="US"/>
        </grant>
        <fee>
            <flat currencyCode="USD">2</flat>
            <to licensePartId="distributor"/>
        </fee>
    </grant>
    <issuer id="distributor">
        <issuedTime>
            2002:05:06
        </issuedTime>
    </issuer>
</license>
```

Note that in all the XML documents above, the issuers may choose to digitally sign the documents using some digital signature algorithms. The recipients of these documents have options to verify the validity of these documents by checking the validity of the attached digital signatures. Access to the various documents, and elements thereof, can be controlled using known techniques.

In some situations offering and granting result in a license with a fresh state for content usage. As one starts to exercise the rights, derived rights, obtained as a result of meta-rights, may inherit and/or share the state variable values associated with the rights. For example, when one is granted with the right to print 5 times and make 4 copies of some document, all new copies may have the same set of rights but share the state (or remaining rights) with the original. After the original has been printed 2 times and a new copy was then made, the copy and original can all together print 3 times and make 2 more new copies.

The preferred embodiment can utilize various devices, such as a personal computers, servers, workstations, PDA's, thin clients and the like. For example, the client environment can be a handheld device such as a mobile phone or a PDA. Various channels for communication can be used. Further, the various functions can be integrated in one device. For example, the license server function can be accomplished by software within the client environment. Further, the function of the license server or other modules for making offers, selecting rights and granting licenses can be accomplished in the same device. The disclosed functional modules are segregated by function for clarity. However, the various functions can be combined or segregated as hardware and/or software modules in any manner. The various functions can be useful separately or in combination.

The various elements and portions thereof can be stored on the same device or on different devices. For example, a license can be stored together with, or separate from, content. Further, the various elements of a license can be stored on separate devices. For example the values of state variables can be stored in a state variable repository of a system that tracks the current value of state variables. Various links, references, specifications, and the like can be used to associate the elements.

The invention has been described through a preferred embodiment and examples. However, various modifications can be made without departing from the scope of the invention as define by the appended claims and legal equivalents.

What we claim is:

1. A method for transferring usage rights adapted to be associated with items within a digital rights management system, said method comprising:
    generating, by a supplier, at least one first offer including usage rights and meta-rights for the items, said usage rights defining a manner of use for the items, said meta-rights specifying rights to derive usage rights or other meta-rights for the items;
    presenting, by the supplier, said offer to a first consumer in said system,
    wherein the offer expresses what rights the consumer can acquire for the items;
    receiving, by the supplier, a selection from the first consumer indicating desired usage rights and meta-rights; and
    generating, by the supplier, a first license granting to the first consumer the usage rights and meta-rights for the items,
    wherein the first license grants the usage rights and meta-rights that are selected by the first consumer during the receiving step.

2. The method of claim 1, wherein said license specifies one or more conditions which must be satisfied in order for said usage right to be exercised and one or more conditions which must be satisfied in order for said meta-rights to be exercised.

3. The method of claim 1, further comprising the step of receiving a request for a license from the first consumer.

4. The method of claim 1, further comprising:
    receiving a request generated by a second consumer for a license including at least one of usage rights and meta-rights for the items;
    generating, by a second supplier, a second offer including rights derived from said meta-rights included in the first license, wherein the second supplier is the first consumer; and
    generating, by the second supplier, a second license including rights derived from said meta-rights included in the second offer.

5. The method of claim 1, wherein the item comprises digital content.

6. The method of claim 1, further comprising the steps of:
    providing said first license as a customized draft license to the first consumer;
    accepting a confirmation of said customized draft license from the first consumer; and
    authenticating said draft license to create an authenticated license.

7. The method of claim 1, wherein said first license comprises a license identification, a digital signature, and at least one grant, said at least one grant including usage rights, meta-rights, a named principal designating the first consumer to whom rights are granted, and a condition list.

8. The method of claim 1, wherein the first supplier is at least one of a provider, distributor, retailer, consumer, and a user.

9. The method of claim 1, wherein the first consumer is at least one of a provider, distributor, retailer, consumer, and a user.

10. The method of claim 1, wherein the step of generating at least one offer comprises the steps of:

collecting usage rights and meta-rights available to be offered;

determining if the supplier has a right to offer the available usage rights and meta-rights;

terminating the generating of a set of offers, if a right to offer other usage and meta rights does not exist;

composing an offer based on available rights if the supplier has the right to offer other usage and meta rights; and authenticating said offer.

11. The method of claim 10, wherein said composing step comprises:

determining if a consumer has requested an offer including specific usage rights and meta-rights;

applying the specific usage rights and meta-rights to the offer as a filter; and determining if an offer template corresponds to the filtered offer and if so applying said offer template as an offer.

12. The method of claim 6, wherein said step of generating a first license further comprises the steps of:

determining if the supplier has the right to grant the rights;

terminating the step of customizing a draft license, if the supplier does not have the right to grant the rights;

analyzing one or more choices received from the consumer;

determining if the choices are acceptable; and creating a draft license based on the choices if the choices are acceptable.

13. The method of claim 12, wherein said step of generating a first license further comprises:

presenting the draft license to the consumer;

re-negotiating a license if the first license is not approved by the consumer; and authenticating the draft license if the first consumer approves the draft license.

14. The method of claim 1, wherein said usage rights specify rights to copy, transfer, loan, play, print, back-up, restore, delete, extract, embed, edit, authorize, install, or un-install the items.

15. A system for transferring usage rights adapted to be associated with an item, to be licensed in multi-tier channels of distribution with downstream rights and conditions assigned at least at one level, said system comprising:

a supplier component, comprising:

a supplier user interface module;

an offer generator module for generating an offer including at least usage rights and meta-rights for the item, the usage rights defining a manner of use for the item, the meta-rights specifying rights to derive usage rights or other meta-rights for the item;

a rights composer module for composing a draft license;

a repository for supplier's rights;

a supplier management database; and a consumer component comprising:

a consumer user interface module;

an offer-consideration module configured to analyze the offers generated by the supplier component and select offers based on the analysis;

a repository for consumer's rights;

a consumer management database; and a communication link coupling said supplier component and said consumer component, wherein the rights composer module is configured to compose a license granting the usage rights and meta-rights that are selected by the offer-consideration module of the consumer component.

16. A system as recited in claim 15, wherein the supplier component further comprises offer-templates and consumer profile information, wherein said offer-template includes one or more predetermined usage rights and meta-rights, and wherein said consumer profile information comprises at least one of consumer identity information, account information, purchase history information, consumer preferences information, and credit rating information.

17. A system as recited in claim 15, wherein said consumer component further comprises a supplier-preference module for providing supplier information.

18. The system of claim 15, wherein said offer-consideration module comprises:

means for determining if the consumer can accept an offer;

means for applying selection logic to the offer;

means for specifying contingencies; and means for authenticating choices and providing the choices to said supplier component.

19. The system of claim 18, wherein said means for applying comprises:

means for parsing the offer and selecting preferred usage rights and meta-rights in the offer;

means for filtering offers based on supplier preferences;

means for applying consumer preferences; and means for selecting options based on the output of said means for parsing, said means for filtering, and said means for applying consumer preferences.

20. The method of claim 1, the method being for generating a license to digital content to be used within the system for at least one of managing use and distribution of the digital content, wherein the license permits the first consumer to exercise the at least one meta-right and permits the first consumer to offer at least one derived right from the at least one meta-right and generate a license including the at least one derived right.

21. The method of claim 20, wherein the at least one derived right in the license is for a second consumer, the license includes usage rights to be exercised by the second consumer and meta-rights permitting derived rights to be offered to a third consumer.

22. The method of claim 1, wherein said method is implemented with one or more hardware and/or software components configured to perform the steps of the method.

23. The method of claim 1, wherein said method is implemented with one or more computer readable instructions embedded on a computer readable medium and configured to cause one or more computer processors to perform the steps of the method.

24. The system of claim 15, wherein said system is implemented with one or more hardware and/or software components.

25. The method of claim 1, wherein rights derived from said meta-rights include rights that revoke at least one of a usage right, and a meta-right.

26. The method of claim 1, wherein rights derived from said meta-rights include rights that reduce or expand at least one of a usage right, and a meta-right.

27. The system of claim 15, wherein rights derived from said meta-rights include rights that revoke at least one of a usage right, and a meta-right.

28. The system of claim 15, wherein rights derived from said meta-rights include rights that reduce or expand at least one of a usage right, and a meta-right.

29. A method for transferring usage rights adapted to be associated with an item within a digital rights management system, the method being performed by a consumer device within the system, the method comprising:

receiving, by the consumer device, from a supplier device within the system at least one offer including usage rights and meta-rights for the item, wherein the usage rights define a manner of use for the item, and the meta-rights specify rights to derive usage rights or other meta-rights for the item, and the offer expresses what rights the consumer device can acquire for the item;

selecting, by the consumer device, desired usage rights and meta-rights from the received offer, wherein the selected rights express what rights the consumer device desires to acquire for the item; and receiving, by the consumer device, a license from the supplier device, wherein the received license grants the usage rights and meta-rights that are selected and provided by the consumer device.

30. The method of claim 29, wherein said method is implemented with one or more hardware and/or software components configured to perform the steps of the method.

31. The method of claim 29, wherein said method is implemented with one or more computer readable instructions embedded on a computer readable medium and configured to cause one or more computer processors to perform the steps of the method.

* * * * *

UNITED STATES PATENT AND TRADEMARK OFFICE
CERTIFICATE OF CORRECTION

| | | |
|---|---|---|
| PATENT NO. | : 7,774,279 B2 | Page 1 of 1 |
| APPLICATION NO. | : 10/162212 | |
| DATED | : August 10, 2010 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2053 days.

Signed and Sealed this

Fifteenth Day of February, 2011

David J. Kappos
*Director of the United States Patent and Trademark Office*